(12) United States Patent
Maruyama

(10) Patent No.: US 10,256,726 B2
(45) Date of Patent: Apr. 9, 2019

(54) VOLTAGE CONVERSION APPARATUS INCLUDING OUTPUT UNIT, COMPARATOR, DELAY CIRCUIT, AND CONTROL CIRCUIT

(71) Applicant: KABUSHIKI KAISHA TOSHIBA, Tokyo (JP)

(72) Inventor: Tatsuhiko Maruyama, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 15/688,542

(22) Filed: Aug. 28, 2017

(65) Prior Publication Data

US 2018/0248483 A1   Aug. 30, 2018

(30) Foreign Application Priority Data

Feb. 28, 2017   (JP) .................................. 2017-037125

(51) Int. Cl.

| | |
|---|---|
| *H02M 3/158* | (2006.01) |
| *H02M 1/08* | (2006.01) |
| *H02M 1/14* | (2006.01) |
| *H02M 3/156* | (2006.01) |
| *H02M 1/00* | (2006.01) |

(52) U.S. Cl.
CPC ............. *H02M 3/158* (2013.01); *H02M 1/08* (2013.01); *H02M 1/14* (2013.01); *H02M 3/156* (2013.01); *H02M 2001/0025* (2013.01)

(58) Field of Classification Search
CPC .......... H02M 3/158; H02M 1/08; H02M 1/14; H02M 2001/0025; H02M 3/156
See application file for complete search history.

(56) References Cited

U.S. PATENT DOCUMENTS

| | | | | |
|---|---|---|---|---|
| 5,933,039 A | * | 8/1999 | Hui ........................... | H03K 5/13 327/262 |
| 8,314,599 B2 | | 11/2012 | Nagai | |
| 9,071,125 B2 | | 6/2015 | Michishita | |
| 9,130,548 B2 | * | 9/2015 | Ishii .......................... | H03K 5/04 |

(Continued)

FOREIGN PATENT DOCUMENTS

| | | |
|---|---|---|
| JP | 2013165537 A | 8/2013 |
| JP | 5320424 B2 | 10/2013 |
| JP | 5735732 B2 | 6/2015 |

*Primary Examiner* — Jue Zhang
*Assistant Examiner* — Jye-June Lee
(74) *Attorney, Agent, or Firm* — Kim & Stewart LLP

(57) ABSTRACT

A voltage conversion apparatus includes an output unit connected to an input voltage to output an output voltage according to a control signal. A comparator compares a reference voltage to a feedback voltage corresponding to the output voltage and outputs a comparison signal. A delay circuit outputs a delayed signal obtained by delaying either a rising timing or a falling timing of the comparison signal. The delay circuit varies a delay time of the delayed signal on basis of a modulating signal. A control circuit is configured to output the control signal to the output unit. The control signal is based on the delayed signal. The control circuit controls the output unit such that a frequency of the output voltage is tuned to a predetermined value set according to the modulating signal.

8 Claims, 13 Drawing Sheets

(56) References Cited

U.S. PATENT DOCUMENTS

| | | | |
|---|---|---|---|
| 2004/0140832 A1* | 7/2004 | Shiah | H03K 5/04 |
| | | | 327/170 |
| 2011/0169464 A1* | 7/2011 | Michishita | H02M 3/1563 |
| | | | 323/271 |
| 2012/0242300 A1 | 9/2012 | Ueno et al. | |
| 2013/0208520 A1* | 8/2013 | Michishita | H02M 7/04 |
| | | | 363/84 |

* cited by examiner

VOLTAGE CONVERSION APPARATUS INCLUDING OUTPUT UNIT, COMPARATOR, DELAY CIRCUIT, AND CONTROL CIRCUIT

This application is based upon and claims the benefit of priority from Japanese Patent Application No. 2017-037125, filed Feb. 28, 2017, the entire contents of which are incorporated herein by reference.

FIELD

Embodiments described herein relate generally to a voltage conversion apparatus.

BACKGROUND

Using an on-chip DC-DC converter for promoting energy conservation has become common. In this case, a nonlinear control (e.g., hysteresis control) DC-DC converter, which is simple in circuit configuration, having a high response speed is often used.

However, in fields such as a wireless communication where strict requirements are imposed on noise, it is required to make an operating frequency of the DC-DC converter constant. However, since the nonlinear control scheme does not need external clocks, there is a problem in that the operating frequency of such a DC-DC converter is not constant.

To address the problem, it has been proposed that a PLL (Phase Locked Loop) be applied to the nonlinear control DC-DC converter; however, this increases the circuit size of the DC-DC converter due to addition of the PLL.

DETAILED DESCRIPTION

In general, according to one embodiment, a voltage conversion apparatus, comprising an output unit connected to an input voltage and configured to output an output voltage according to a control signal supplied to the output unit. A comparator is configured to compare a reference voltage to a feedback voltage corresponding to the output voltage and then output a comparison signal corresponding to the comparison. A delay circuit is configured to output a delayed signal obtained by delaying either a rising timing or a falling timing of the comparison signal output from the comparator. The delay circuit varies a delay time of the delayed signal on basis of a modulating signal. A control circuit is configured to output the control signal to the output unit. The control signal is based on the delayed signal. The control circuit controls the output unit such that a frequency of the output voltage is tuned to a predetermined value set according to the modulating signal.

Example embodiments of the present disclosure will be described hereinafter with reference to the drawings.

First Embodiment

Figure 1:
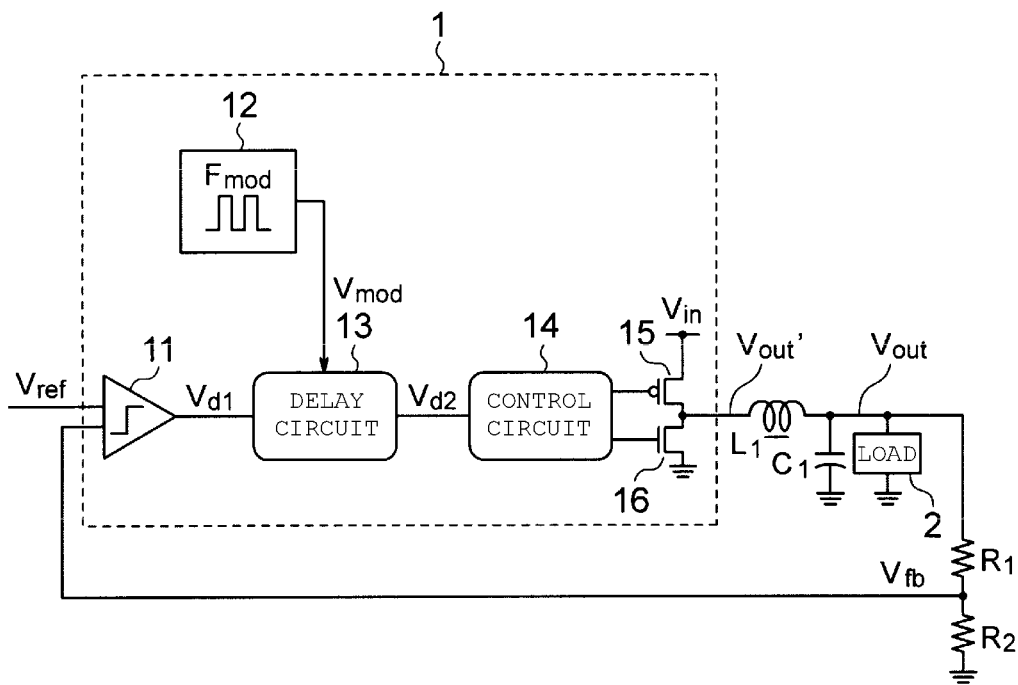
FIG. 1 is a circuit diagram illustrating a configuration of a voltage conversion apparatus according to a first embodiment.

FIG. 1 is a circuit diagram illustrating a configuration of a voltage conversion apparatus 1 according to a first embodiment. FIG. 1 shows a nonlinear control DC-DC converter with a voltage conversion apparatus 1, an inductor $L_1$, a capacitor $C_1$, and resistors $R_1$ and $R_2$.

The voltage conversion apparatus 1 receives an input voltage $V_{in}$ and outputs as an output voltage $V_{out}$, a rectangular wave alternating between the input voltage $V_{in}$ and 0 V (hereinafter, the output voltage $V_{out}$ may also be referred to as "output signal $V_{out}$"). The voltage conversion apparatus 1 according to the present embodiment is a semiconductor chip. The output voltage $V_{out}$, changes to a final output voltage $V_{out}$ (hereinafter, the output voltage $V_{out}$ may also be referred to as "output signal $V_{out}$") by interaction with the inductor $L_1$ and the capacitor $C_1$. The output voltage $V_{out}$ can be supplied to a load 2.

The inductor $L_1$, the resistor $R_1$, and the resistor $R_2$ are connected in series between an output terminal of the voltage conversion apparatus 1 and a ground node. The capacitor $C_1$ and the load 2 are connected in parallel between the ground node and a node located between the inductor $L_1$ and the resistor $R_1$. The resistors $R_1$ and $R_2$ divide the output voltage $V_{out}$ to generate a feedback voltage $V_{fb}$. The feedback voltage $V_{fb}$ is supplied to the voltage conversion apparatus 1 from a node between the resistors $R_1$ and $R_2$.

The voltage conversion apparatus 1 controls the output voltage $V_{out}$, on the basis of the input voltage $V_{in}$, a reference voltage $V_{ref}$ and the feedback voltage $V_{fb}$. As a result, the voltage conversion apparatus 1 outputs the output voltage $V_{out'}$ according to the reference voltage $V_{ref}$. Specifically, an average value of the output voltage $V_{out'}$ is the value obtained by multiplying the reference voltage $V_{ref}$ by $(R_1+R_2)/R_2$. The output voltage $V_{out'}$ and the output voltage $V_{out}$ are described later in more detail.

The voltage conversion apparatus 1 includes a comparator 11, a modulating signal supply circuit 12, a delay circuit 13, a control circuit 14, and first and second output transistors 15 and 16. The first and second output transistors 15 and 16 are collectively an example of an output unit.

The comparator 11 compares the feedback voltage $V_{fb}$ to the reference voltage $V_{ref}$ and outputs a comparison signal $V_{d1}$ indicating a result of comparison to the delay circuit 13. The modulating signal supply circuit 12 supplies a modulating signal $V_{mod}$ which is a signal that changes level periodically, to the delay circuit 13. The modulating signal $V_{mod}$ according to the present embodiment is a pulse signal having a constant frequency $F_{mod}$.

The delay circuit 13 is a circuit that outputs, to the control circuit 14, a delay signal $V_{d2}$ obtained by delaying either rising timing or falling timing of the comparison signal $V_{d1}$. The delay circuit 13 changes delay time of the delay signal $V_{d2}$ on the basis of the modulating signal $V_{mod}$. A configuration and an operation of the delay circuit 13 are described later in more detail.

The control circuit 14 controls the first and second output transistors 15 and 16 on the basis of the delay signal $V_{d2}$. As a result, a frequency of the output signals $V_{out'}$ and $V_{out}$ is tuned to a predetermined value dependent on the modulating signal $V_{mod}$, or specifically tuned to the frequency $F_{mod}$ of the modulating signal $V_{mod}$.

The first and second output transistors 15 and 16 are connected in series between an input terminal of the voltage conversion apparatus 1 and the ground node. Here, the first output transistor 15 is a pMOS transistor and the second output transistor 16 is an nMOS transistor. A control signal is input from the control circuit 14 to gates of the first and second output transistors 15 and 16. A node between the first and second output transistors 15 and 16 is connected to the output terminal of the voltage conversion apparatus 1. Thus, the input voltage $V_{in}$ is supplied to the first and second output transistors 15 and 16 from the input terminal of the voltage conversion apparatus 1, and the first and second output transistors 15 and 16 supply the output voltage $V_{out'}$ according to the reference voltage $V_{ref}$.

Figure 2A:
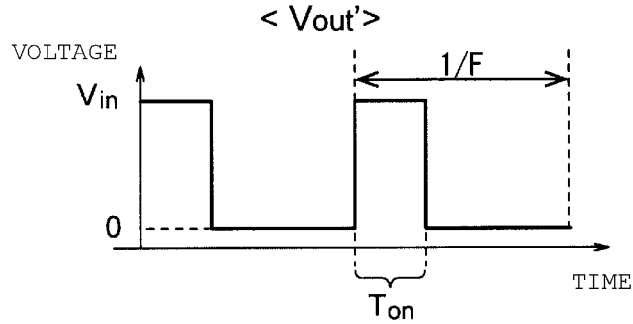
FIGS. 2A and 2B are waveform charts for describing an operation of the voltage conversion apparatus according to the first embodiment.
Figure 2B:
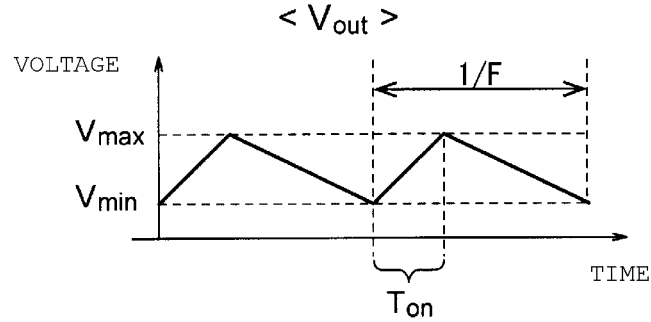

FIGS. 2A and 2B are waveform charts for describing an operation of the voltage conversion apparatus 1 according to the first embodiment.

FIG. 2A shows an example of the output voltage $V_{out'}$ and FIG. 2B shows an example of the output voltage $V_{out}$. Here, the frequency F represents the frequency of these output voltages $V_{out'}$ and $V_{out}$. The time $T_{on}$ represents delay time of the abovementioned delay signal $V_{d2}$. The symbols $V_{max}$ and $V_{min}$ represent a maximum value and a minimum value of the output voltage $V_{out}$, respectively. The delay circuit 13 and the control circuit 14 operate to tune the frequency F of these output voltages $V_{out'}$ and $V_{out}$ to the frequency $F_{mod}$ of the modulating signal $V_{mod}$ (e.g., $F=F_{mod}$).

The output voltage $V_{out'}$ shown in FIG. 2A is a rectangular pulse wave having a maximum value $V_{in}$, a minimum value 0, and a pulse width $T_{on}$. The average value of the output voltage $V_{out'}$ shown in FIG. 2A is the value obtained by multiplying the reference voltage $V_{ref}$ by $(R_1+R_2)/R_2$, as described above. On the other hand, the output voltage $V_{out}$ shown in FIG. 2B is a triangular wave changing from the minimum value $V_{min}$ to the maximum value $V_{max}$ over time $T_{on}$.

A duty cycle D of the output voltage $V_{out'}$ is approximated by the following Expression (1). The frequency F of the output voltages $V_{out'}$ and $V_{out}$ is provided by the following Expression (2).

$$D=T_{on}/(1/F)\approx V_{out}/V_{in} \quad (1)$$

$$F=D/T_{on}\approx V_{out}/(V_{in}T_{on}) \quad (2)$$

In Expressions (1) and (2), $V_{in}$ and $V_{out}$ represent average values of the voltages $V_{in}$ and $V_{out}$, respectively.

Figure 3:
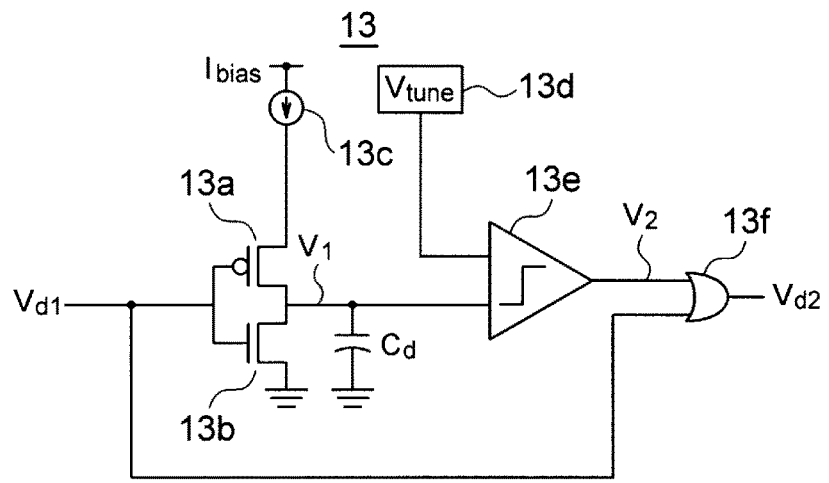
FIG. 3 is a circuit diagram illustrating a configuration of a delay circuit according to the first embodiment.

FIG. 3 is a circuit diagram illustrating a configuration of the delay circuit 13 according to the first embodiment.

The delay circuit 13 includes first and second transistors 13a and 13b, which are an example of a second output unit, a current source 13c, a voltage supply unit 13d, a comparator 13e, which is an example of a second comparator, an OR logic unit 13f, and a capacitor $C_d$.

The first and second transistors 13a and 13b are connected in series between the current source 13c and the ground node. Here, the first transistor 13a is a pMOS transistor and the second transistor 13b is an nMOS transistor. The comparison signal $V_{d1}$ is input from the comparator 11 to gates of the first and second transistors 13a and 13b. The first and second transistors 13a and 13b output a first signal $V_1$ in response to the comparison signal $V_{d1}$ to a node between the first and second transistors 13a and 13b to supply the first signal $V_1$ to the comparator 13e and the capacitor $C_d$. The capacitor $C_d$ is disposed between this node and the ground node.

The current source 13c supplies a bias current $I_{bias}$ to the first transistor 13a. The first and second transistors 13a and 13b output the first signal $V_1$ on the basis of this bias current $I_{bias}$ and the comparison signal $V_{d1}$. The voltage supply unit 13d supplies a voltage $V_{tune}$, which is used as a reference signal, to the comparator 13e.

The comparator 13e compares the first signal $V_1$ to the voltage $V_{tune}$ and outputs a second signal $V_2$ indicating a result of comparison between these signals to the OR logic unit 13f. The OR logic unit 13f outputs the delay signal $V_{d2}$ indicating a result of OR logical operation on the comparison signal $V_{d1}$ and the second signal $V_2$.

The delay circuit 13 periodically changes the bias current $I_{bias}$ from the current source 13c, the voltage $V_{tune}$ from the voltage supply unit 13d, or a capacitance of the capacitor $C_d$ on the basis of the abovementioned modulating signal $V_{mod}$. In addition, the delay circuit 13 changes the delay time $T_{on}$ of the delay signal $V_{d2}$ on the basis of the bias current $I_{bias}$, the voltage $V_{tune}$ or the capacitance as described above. As a result, the frequency of the output signal $V_{out'}$ (and the output signal $V_{out}$) is tuned to the frequency $F_{mod}$ (of the modulating signal $V_{mod}$). Details associated with periodic changes of the bias current $I_{bias}$, the voltage $V_{tune}$, or the capacitance will be discussed below in conjunction with second to fifth embodiments.

Figure 4A:
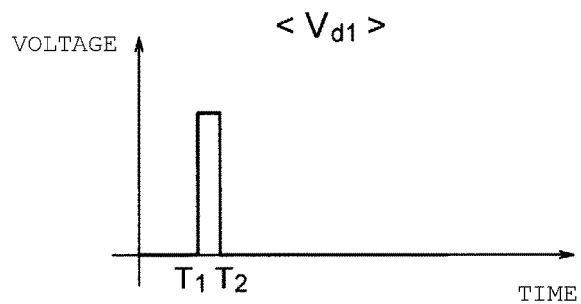
FIGS. 4A to 4C are waveform charts for describing an operation of the delay circuit according to the first embodiment.
Figure 4B:
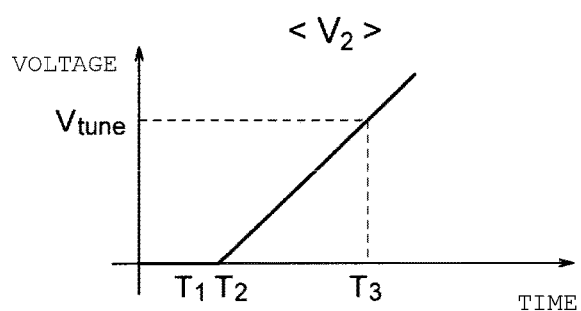
Figure 4C:
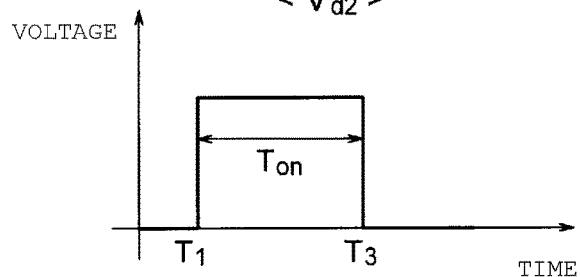

FIGS. 4A to 4C are waveform charts for describing an operation of the delay circuit 13 according to the first embodiment.

FIGS. 4A, 4B, and 4C show an example of the comparison signal $V_{d1}$, the second signal $V_2$, and the delay signal $V_{d2}$, respectively. The comparison signal $V_{d1}$ as shown in FIG. 4A changes from low to high at time $T_1$ and changes from high to low at time $T_2$. Owing to this, the second signal $V_2$ as shown in FIG. 4B starts increasing at time $T_2$ and reaches the voltage $V_{tune}$ at time $T_3$. As a result, the delay signal $V_{d2}$ as shown in FIG. 4C changes from low to high at the time $T_1$ and changes from high to low at the time $T_3$.

In this way, the delay circuit 13 maintains the rising timing of the comparison signal $V_{d1}$ to the time $T_1$ and delays the falling timing of the comparison signal $V_{d1}$ from the time $T_2$ to the time $T_3$, thereby generating the delay signal $V_{d2}$. The delay time $T_{on}$ of the delay signal $V_{d2}$ is "$T_3 - T_1$".

As seen from FIGS. 4B and 4C, when the voltage $V_{tune}$ changes, the delay time $T_{on}$ changes accordingly. For example, when the voltage $V_{tune}$ changes at the frequency $F_{mod}$, the delay time $T_{on}$ also changes at the frequency $F_{mod}$. In this way, the delay circuit 13 can periodically change the delay time $T_{on}$ depending on the modulating signal $V_{mod}$ by periodically changing the voltage $V_{tune}$ in response to the modulating signal $V_{mod}$. The same thing is true for a case of periodically changing the bias current $I_{bias}$ or a case of periodically changing the capacitance of the capacitor $C_d$. The delay time $T_{on}$ is approximated by the following Expression (3).

$$T_{on} \approx V_{tune} C_d / I_{bias} \qquad (3)$$

In Expression (3), $C_d$ represents the capacitance of the capacitor $C_d$.

It is noted that the comparison signal $V_{d1}$ and the delay signal $V_{d2}$ need not necessarily be positive logic but may be negative logic. In the latter case, the delay circuit 13 maintains the falling timing of the comparison signal $V_{d1}$ to the time $T_1$ and delays the rising timing of the comparison signal $V_{d1}$ from the time $T_2$ to the time $T_3$, thereby generating the delay signal $V_{d2}$.

Figure 5A:
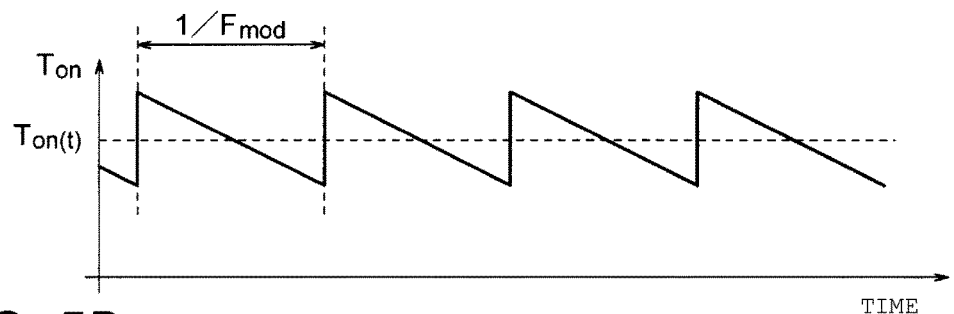
FIGS. 5A and 5B are waveform charts for describing an example of delay time according to the first embodiment.
Figure 5B:
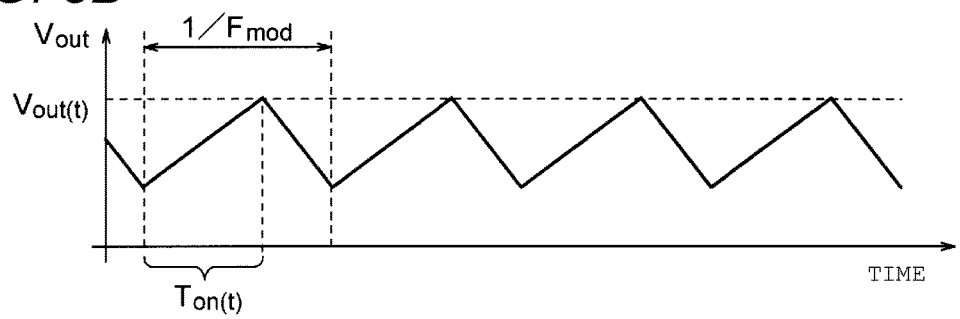

FIGS. 5A and 5B are waveform charts for describing an example of the delay time $T_{on}$ according to the first embodiment.

FIG. 5A shows an example of the delay time $T_{on}$. As shown in FIG. 5A, the delay circuit 13 periodically changes the delay signal $T_{on}$ on the basis of the modulating signal $V_{mood}$. The delay time $T_{on}$ shown in FIG. 5A periodically changes as a "saw-tooth wave" of the frequency $F_{mod}$. The reference symbol $T_{on(t)}$ represents a desired value of the delay time $T_{on}$.

FIG. 5B shows an example of the output voltage $V_{out}$. When the delay time $T_{on}$ periodically changes at the frequency $F_{mod}$ the frequency F of the output voltage $V_{out}$ is tuned to the frequency $F_{mod}$ (so $F = F_{mod}$) as shown in FIG. 5B. Reference symbol $V_{out(t)}$ represents a desired maximum value of the output voltage $V_{out}$. When the frequency F of the output voltage $V_{out}$ is tuned to the frequency $F_{mod}$, the time over which the output voltage $V_{out}$ changes from the minimum value to the maximum value is $T_{on(t)}$. The time $T_{on(t)}$ is approximated by the following Expression (4).

$$T_{on(t)} \approx V_{out}/(V_{in} F_{mod}) \qquad (4)$$

In Expression (4), $V_{in}$ and $V_{out}$ represent average values of the voltages $V_{in}$ and $V_{out}$, respectively.

Figure 6A:
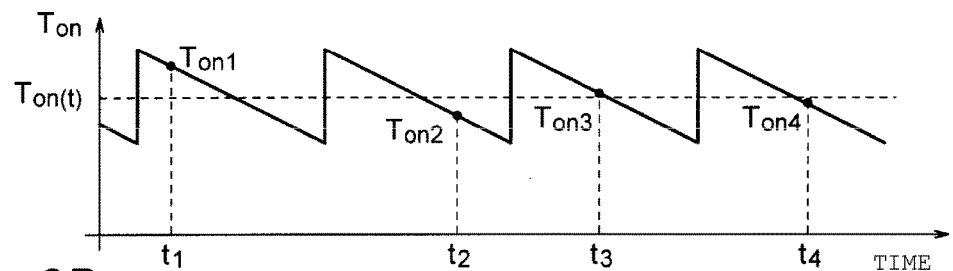
FIGS. 6A and 6B are waveform charts for describing an example of delay time according to the first embodiment.
Figure 6B:
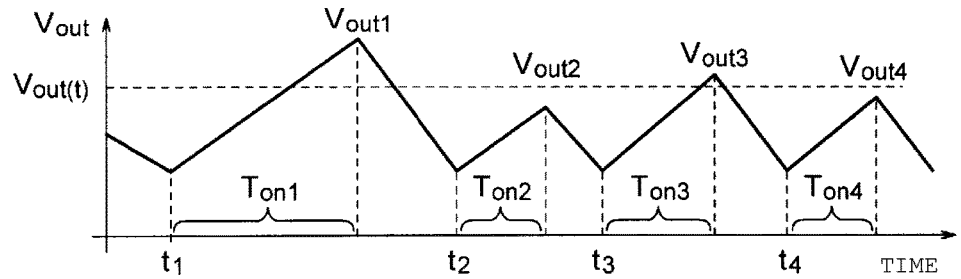

FIGS. 6A and 6B are waveform charts for describing an example of the delay time $T_{on}$ according to the first embodiment. FIGS. 6A and 6B depict a process in which the frequency F of the output voltage $V_{out}$ is tuned to the frequency $F_{mod}$.

FIG. 6A shows examples of the delay time $T_{on}$ and FIG. 6B shows examples the output voltage $V_{out}$. Here, times $t_1$, $t_2$, $t_3$, and $t_4$ each represent the time at which the comparison signal $V_{d1}$ changes from low to high similarly as for the time $T_1$ shown in FIG. 4A.

When the comparison signal $V_{d1}$ changes from low to high at the time $t_1$, the output voltage $V_{out}$ starts increasing at the time $t_1$ (see FIG. 6B). Delay time $T_{on1}$ from the time $t_1$ is longer than the desired value $T_{on(t)}$ (see FIG. 6A). As a result, an output voltage $V_{out1}$ at time $t_1 + T_{on1}$ becomes higher than the desired value $V_{out(t)}$ (see FIG. 6B). The time period from the time $t_1$ to time $t_2$ is too long as well.

Subsequently, when the comparison signal $V_{d1}$ changes from low to high at the time $t_2$, the output voltage Vout starts increasing again at the time $t_2$. Delay time $T_{on2}$ from the time $t_2$ is shorter than the desired value $T_{on(t)}$. As a result, an output voltage $V_{out2}$ at time $t_2 + T_{on2}$ becomes lower than the desired value $V_{out(t)}$. The time period from the time $t_2$ to time $t_3$ is too short as well.

The comparison signal $V_{d1}$ and the output voltage $V_{out}$ repeatedly change in the same manner. As a result, the comparison signal $V_{d1}$ changes from low to high at time at which the delay time $T_{on}$ is equal to the desired value $T_{on(t)}$ (see FIG. 5A). Furthermore, the output voltage $V_{out}$ becomes equal to the desired value $V_{out(t)}$ (see FIG. 5B). In this way, the frequency F of the output voltage $V_{out}$ is tuned to the frequency $F_{mod}$. That is, the operating frequency F of the voltage conversion apparatus 1 is fixed to the frequency $F_{mod}$.

Figure 7A:
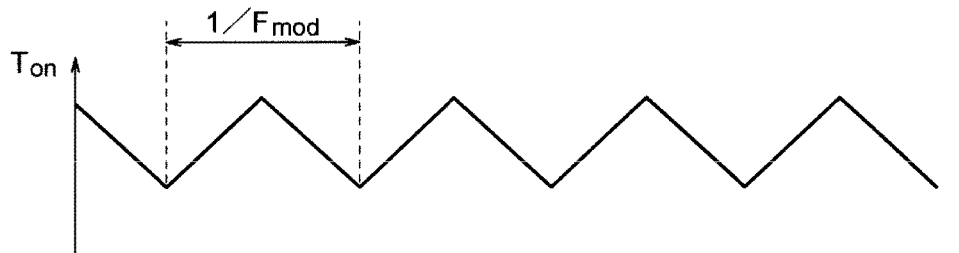
FIGS. 7A and 7B are waveform charts for describing another example of the delay time according to the first embodiment.
Figure 7B:
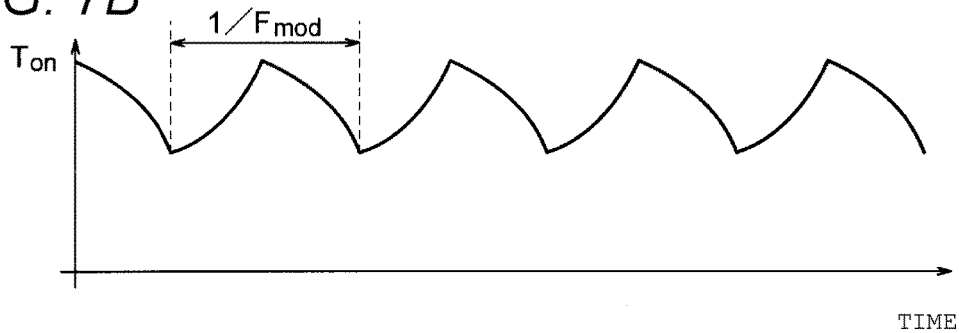

FIGS. 7A and 7B are waveform charts for describing another example of the delay time $T_{on}$ according to the first embodiment.

The delay time $T_{on}$ according to the first embodiment may change in the form other than the form of the saw-tooth wave so long as the delay time $T_{on}$ changes periodically. FIG. 7A shows the delay time $T_{on}$ periodically changing in the form of a "triangular wave" of the frequency $F_{mod}$ as an example. FIG. 7B shows the delay time $T_{on}$ periodically changing in the form of a "pseudo triangular wave" of the frequency $F_{mod}$ as another example. The delay time $T_{on}$ periodically changing in the form of a "sine wave" of the frequency $F_{mod}$ may be considered as yet another example.

As described so far, the voltage conversion apparatus 1 changes the delay time $T_{on}$ of the delay signal $V_{d2}$ on the basis of the modulating signal $V_{mod}$, and tunes the frequency F of the output signal $V_{out}$, and the output signal $V_{out}$ to the frequency $F_{mod}$ of the modulating signal $V_{mod}$. It is, therefore, possible to tune the operating frequency of the non-linear control DC-DC converter to a constant frequency without using a large-sized circuit such as a PLL. That is, according to the first embodiment, it is possible to fix the operating frequency of the voltage conversion apparatus 1 using a simple circuit configuration.

Second Embodiment

Figure 8:
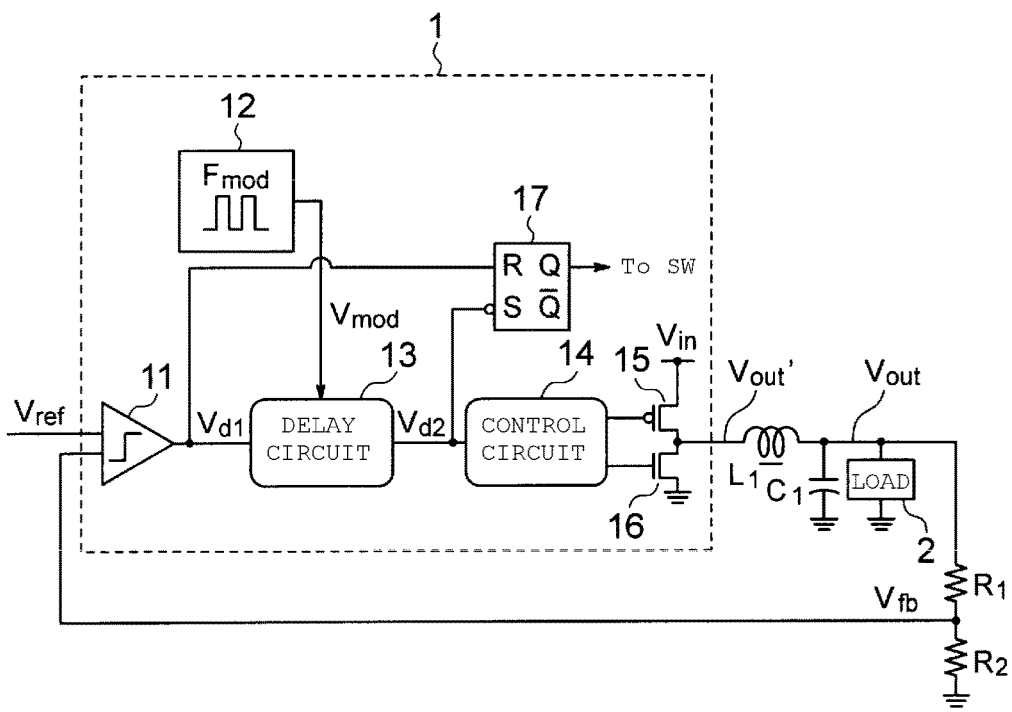
FIG. 8 is a circuit diagram illustrating a configuration of a voltage conversion apparatus according to a second embodiment.

FIG. 8 is a circuit diagram illustrating a configuration of the voltage conversion apparatus 1 according to a second embodiment.

The voltage conversion apparatus 1 shown in FIG. 8 includes a flip-flop 17 in addition to the elements shown in FIG. 1. The flip-flop 17 includes an R (reset) terminal to which the comparison signal $V_{d1}$ is input, an S (set) terminal to which the delay signal $V_{d2}$ is input, and a Q terminal from which an output signal in response to the comparison signal $V_{d1}$ and the delay signal $V_{d2}$ is output. The output signal from the Q terminal is supplied to a switch SW (to be further described below).

Figure 9:
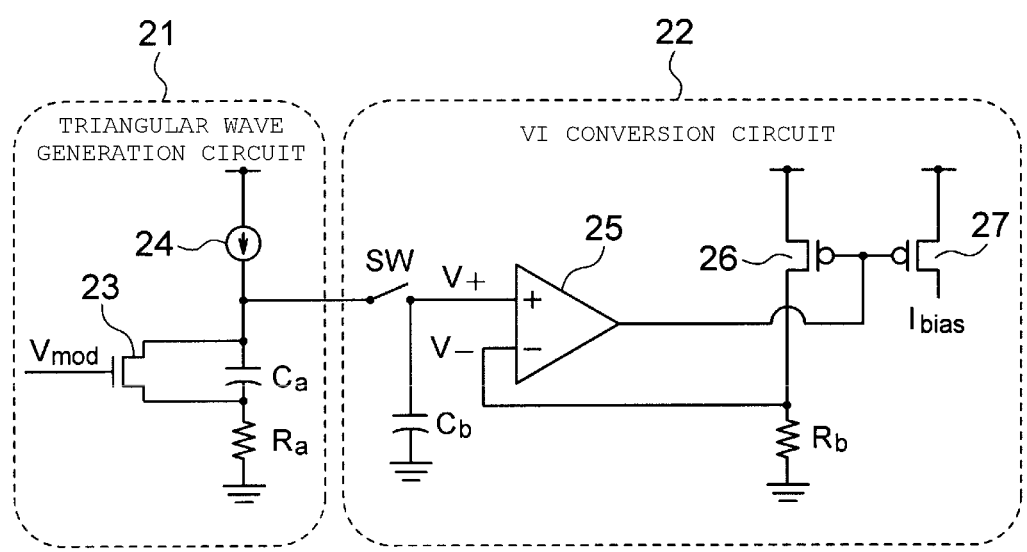
FIG. 9 is a circuit diagram illustrating a configuration of a current source according to the second embodiment.

FIG. 9 is a circuit diagram illustrating a configuration of the current source 13c according to the second embodiment.

The current source 13c according to the second embodiment includes a triangular wave generation circuit 21 and a VI (voltage-to-current) conversion circuit 22. The triangular wave generation circuit 21 includes a transistor 23, a current source 24, a capacitor $C_a$, and a resistor $R_a$. The VI conversion circuit 22 includes an operational amplifier 25, a first transistor 26, a second transistor 27, the switch SW, a capacitor $C_b$, and a resistor $R_b$.

The delay circuit 13 according to the second embodiment periodically changes the bias current $I_{bias}$ by means of current source 13c. On the other hand, here it is assumed that the voltage $V_{tune}$ of the voltage supply unit 13d and the capacitance of the capacitor $C_d$ are constant. As a result, the delay time $T_{on}$ of the delay signal $V_{d2}$ changes depending on the bias current $I_{bias}$. The bias current $I_{bias}$ is an example of a modulation current changing periodically.

The modulating signal $V_{mod}$ is supplied to a gate of the transistor 23. The capacitor $C_a$ and the resistor $R_a$ are connected in series between the current source 24 and the ground node, and the capacitor $C_a$ is connected in parallel to the transistor 23. The current source 24 is a constant-current source that supplies a current to the transistor 23 and the capacitor $C_a$. With such a circuit configuration, the triangular wave generation circuit 21 outputs a triangular wave voltage from a node between the current source 24 and the capacitor $C_a$.

The switch SW is disposed between this node and a non-inverting input (+) terminal of the operational amplifier 25, and the capacitor $C_b$ is disposed between this non-inverting input terminal and the ground node. The switch SW receives the output signal from the flip-flop 17, passes the triangular wave voltage when the output signal from the flip-flop 17 is high (switch SW is closed), and cuts off the triangular wave voltage when the output signal from the flip-flop 17 is low (switch SW is opened). In this way, the output signal from the flip-flop 17 is used to control timing of supplying the triangular wave voltage to the VI conversion circuit 22.

Reference symbol V+ represents a voltage applied to the non-inverting input terminal of the operational amplifier 25, and reference symbol V− represents a voltage applied to an inverting input (−) terminal of the operational amplifier 25. The inverting input terminal of the operational amplifier 25 is connected to a node between a drain of the first transistor 26 and the resistor 26 $R_b$. As a result, the operational amplifier 25 functions as a voltage follower and a voltage of this node is equal to the voltage V+ or V−. An output terminal of the operational amplifier 25 is connected to gates of the first and second transistors 26 and 27.

It is noted that the capacitor $C_b$ functions to maintain the voltage V+ at a voltage level equal to the level just before cutoff while the switch SW cuts off the triangular wave voltage.

The gate of the first transistor 26 is connected to the output terminal of the operational amplifier 25 and to the gate of the second transistor 27, and the first and second transistors 26 and 27 constitute a current mirror. The resistor $R_b$ is disposed between the drain of the first transistor 26 and the ground node. An output voltage from the operational amplifier 25 is applied to the gates of the first and second transistors 26 and 27. The second transistor 27 outputs the bias current $I_{bias}$ in response to this output voltage as a drain current. With such a configuration, the VI conversion circuit 22 converts the triangular wave voltage into the bias current $I_{bias}$ to generate the periodically changing bias current $I_{bias}$.

Figure 10A:
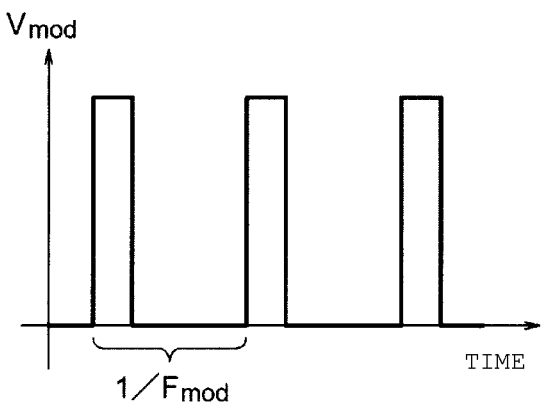
FIGS. 10A to 10C are waveform charts for describing an operation of the current source according to the second embodiment.
Figure 10B:
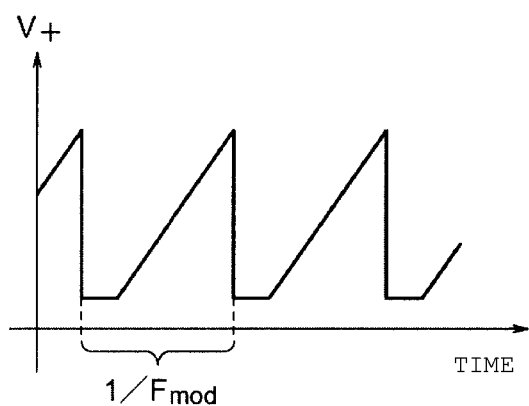
Figure 10C:
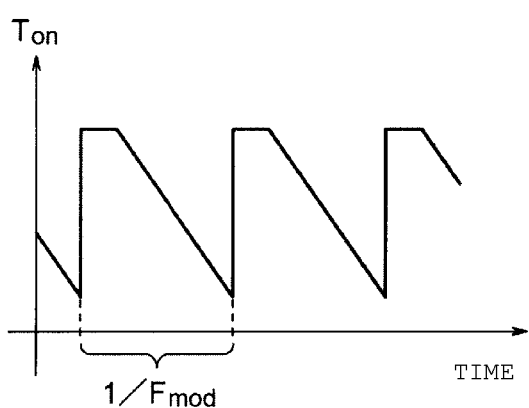

FIGS. 10A to 10C are waveform charts for describing an operation of the current source 13c according to the second embodiment.

FIGS. 10A, 10B, and 10C show an example of the modulating signal $V_{mod}$, the voltage V+, and the delay time $T_{on}$, respectively. The triangular wave generation circuit 21 outputs the triangular wave voltage in response to the modulating signal $V_{mod}$ shown in FIG. 10A. As a result, the voltage V+ at the frequency $F_{mod}$ is applied to the non-inverting input terminal of the operational amplifier 25 (FIG. 10B). Thus, the output voltage from the operational amplifier 25 and the bias current $I_{bias}$ from the VI conversion circuit 22 have similar waveforms as that shown in FIG. 10B. As a result, the delay time $T_{on}$ has a waveform inverted from that of the voltage V+ and periodically changes at the frequency $F_{mod}$ (FIG. 10C).

As described so far, the delay circuit 13 according to the second embodiment periodically changes the delay time $T_{on}$ by changing the bias current $I_{bias}$. It is thereby possible to tune the frequency F of the output signal $V_{out}$, and the output signal $V_{out}$ to the frequency $F_{mod}$ of the modulating signal $V_{mod}$. According to the second embodiment, the current source 13c can be simpler than a PLL component yet still enables the operating frequency of the voltage conversion apparatus 1 to be fixed.

Third Embodiment

Figure 11:
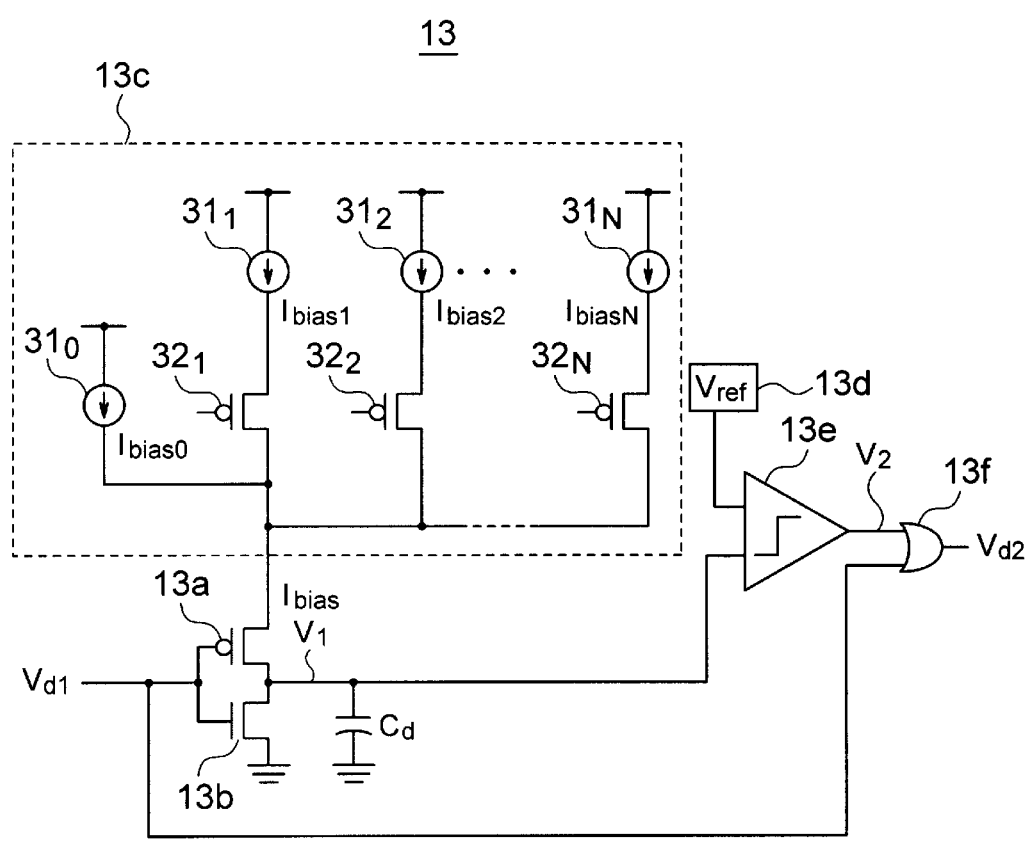
FIG. 11 is a circuit diagram illustrating a configuration of a delay circuit according to a third embodiment.

FIG. 11 is a circuit diagram illustrating a configuration of the delay circuit 13 according to a third embodiment.

The current source 13c according to the third embodiment includes a current source $31_0$, current sources $31_1$ to $31_N$, which are examples of the first to $N^{th}$ current sources, and transistors $32_1$ to $32_N$, which are examples of the first to $N^{th}$ switches (where N is an integer equal to or greater than 2).

The current sources $31_0$ to $31_N$ are constant-current sources that supply currents $I_{bias0}$ to $I_{biasN}$ to the first transistor $13_a$, and are connected in parallel to one another. The transistors $32_1$ to $32_N$ are connected in series with the current sources $31_1$ to $31_N$, respectively. Modulating signals $V_{mod}$, which can be different from one another, are supplied to gates of the transistors $32_1$ to $32_N$, respectively.

The current source 13c according to the third embodiment generates the periodically changing bias current $I_{bias}$ using the currents $I_{bias0}$ to $I_{biasN}$ from the current sources $31_0$ to $31_N$. On the other hand, it is assumed here that the voltage $V_{tune}$ of the voltage supply unit 13d and the capacitance of the capacitor $C_d$ are constant. As a result, the delay time $T_{on}$ of the delay signal $V_{d2}$ changes depending on the bias current $I_{bias}$. The bias current $I_{bias}$ is an example of a modulation current changing periodically.

It is noted that FIG. 11 shows the reference voltage $V_{ref}$ as an example of the constant voltage $V_{tune}$. However, this reference voltage $V_{ref}$ may be either the same as the reference voltage $V_{ref}$ shown in FIG. 1 or different from the reference voltage $V_{ref}$ shown in FIG. 1.

FIGS. 12A to 12D are waveform charts for describing an operation of the delay circuit 13 according to the third embodiment.

Figure 12A:
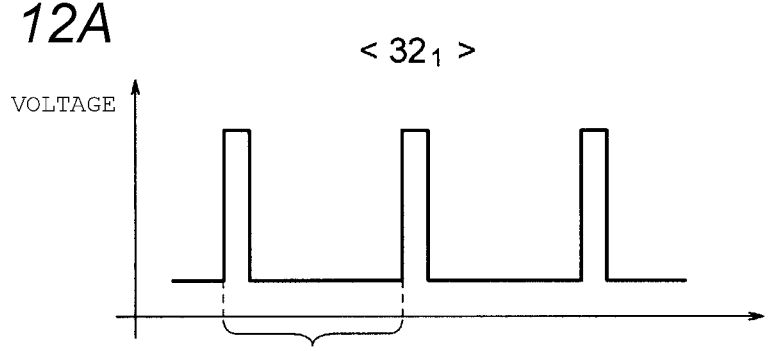
FIGS. 12A to 12D are waveform charts for describing an operation of the delay circuit according to the third embodiment.
Figure 12B:
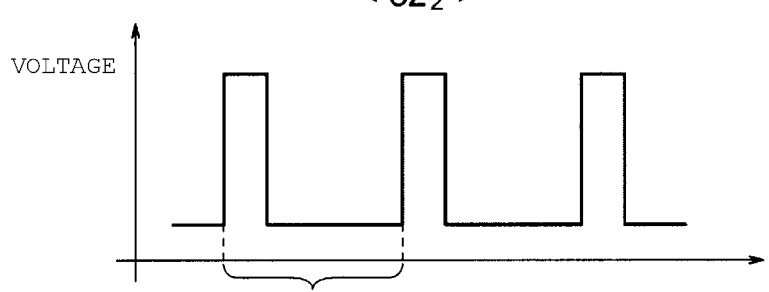
Figure 12C:
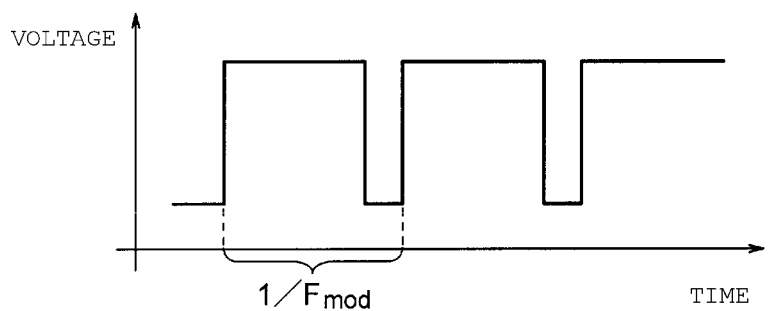
Figure 12D:
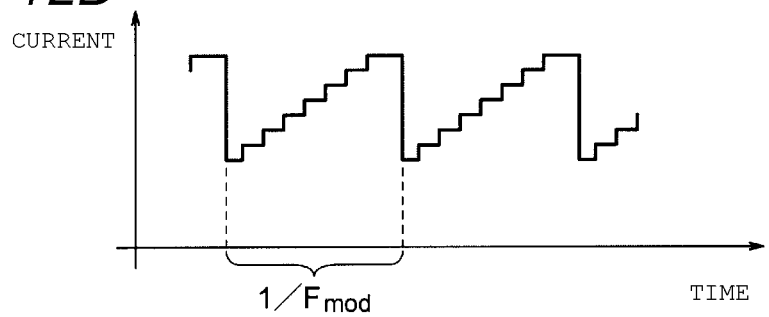

FIGS. 12A, 12B, and 12C show an example of the modulating signals $V_{mod}$ supplied to the transistors $32_1$, $32_2$, and $32_N$, respectively. FIG. 12D shows an example of the bias current $I_{bias}$. The modulating signals $V_{mod}$ supplied to the transistors $32_1$ to $32_N$ periodically change at the frequency $F_{mod}$ but differ in pulse width (FIGS. 12A to 12C). As a result, a waveform of the bias current $I_{bias}$ becomes a stepped waveform periodically changing at the frequency $F_{mod}$ as shown in FIG. 12D.

As described so far, while the delay circuit 13 according to the second embodiment changes the bias current $I_{bias}$ in a continuous periodic waveform, the delay circuit 13 according to the third embodiment changes the bias current $I_{bias}$ in a discrete periodic waveform. The voltage conversion apparatus 1 according to the third embodiment can still periodically change the delay time $T_{on}$, and tune the frequency F of the output signal $V_{out'}$ and the output signal $V_{out}$ to the frequency $F_{mod}$ of the modulating signals $V_{mod}$. According to the third embodiment, the current source 13c is simpler than a PLL yet still enables the operating frequency of the voltage conversion apparatus 1 to be fixed.

Fourth Embodiment

Figure 13:
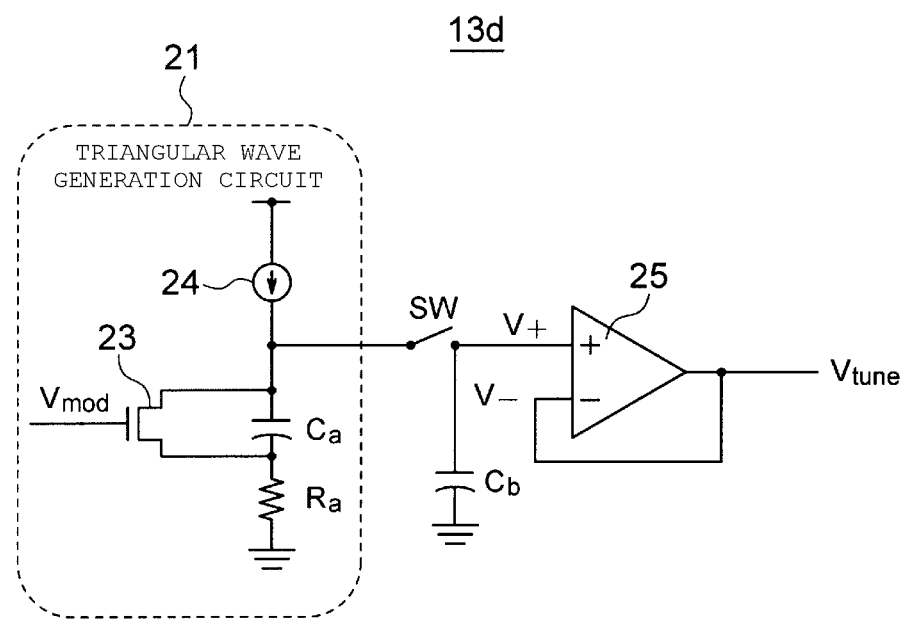
FIG. 13 is a circuit diagram illustrating a configuration of a voltage supply unit according to a fourth embodiment.

FIG. 13 is a circuit diagram illustrating a configuration of the voltage supply unit 13d according to a fourth embodiment.

The voltage supply unit 13d shown in FIG. 13 is configured such that the first transistor 26, the second transistor 27, and the resistor $R_b$ are eliminated from the current source 13c shown in FIG. 9. However, differently from the current source 13c shown in FIG. 9, the inverting input terminal of the operational amplifier 25 is connected to the output terminal of the operational amplifier 25. The operational amplifier 25 outputs an output voltage identical in value to the voltage V+ from the output terminal, and this output voltage serves as the voltage $V_{tune}$. Similarly to the delay circuit 13 according to the second embodiment, the delay circuit 13 according to the fourth embodiment can be provided in the voltage conversion apparatus 1 shown in FIG. 8 and an operation of the switch SW can be controlled by the flip-flop 17.

The delay circuit 13 according to the fourth embodiment periodically changes the voltage $V_{tune}$ by means of such a voltage supply unit 13d. On the other hand, it is assumed here that the bias current $I_{bias}$ of the current source 13c and the capacitance of the capacitor $C_d$ are constant. As a result, the delay time $T_{on}$ of the delay signal $V_{d2}$ changes depending on the voltage $V_{tune}$. The voltage $V_{tune}$ is an example of a modulation voltage changing periodically.

Figure 14A:
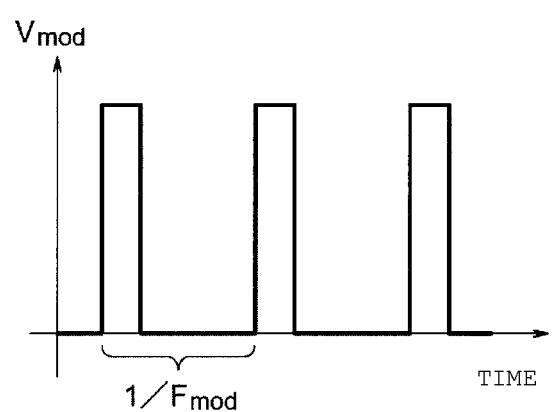
FIGS. 14A to 14C are waveform charts for describing an operation of the voltage supply unit according to the fourth embodiment.
Figure 14B:
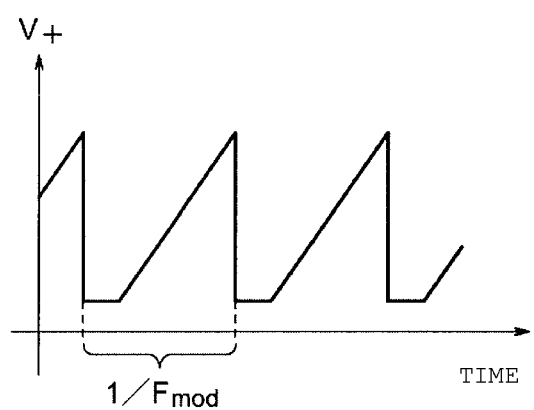
Figure 14C:
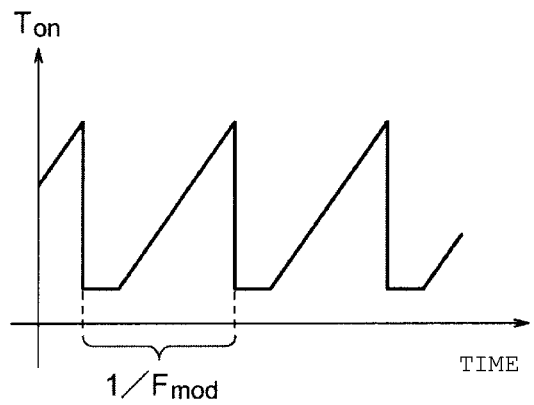

FIGS. 14A to 14C are waveform charts for describing an operation of the voltage supply unit 13d according to the fourth embodiment.

FIGS. 14A, 14B, and 14C show an example of the modulating signal $V_{mod}$ the voltage V+, and the delay time $T_{on}$, respectively. The triangular wave generation circuit 21 outputs the triangular wave voltage in response to the modulating signal $V_{mod}$ shown in FIG. 14A. As a result, the voltage V+ at the frequency $F_{mod}$ is applied to the non-inverting input terminal of the operational amplifier 25 (FIG. 14B). Thus, the voltage $V_{tune}$ and the delay time $T_{on}$ have similar waveforms to that shown in FIG. 14B, and the delay time $T_{on}$ periodically changes at the frequency $F_{mod}$ (FIG. 14C).

As described so far, the delay circuit 13 according to the fourth embodiment periodically changes the delay time $T_{on}$ by periodically changing the voltage $V_{tune}$. It is thereby possible to tune the frequency F of the output signal $V_{out'}$ and the output signal $V_{out}$ to the frequency $F_{mod}$ of the modulating signal $V_{mod}$. According to the fourth embodiment, the voltage supply unit 13d simpler than a PLL yet still enables the operating frequency of the voltage conversion apparatus 1 to be fixed. Furthermore, according to the fourth embodiment, the voltage supply unit 13d is simpler than the current source 13c according to the second embodiment yet still enables the operating frequency of the voltage conversion apparatus 1 to be fixed.

Fifth Embodiment

Figure 15:
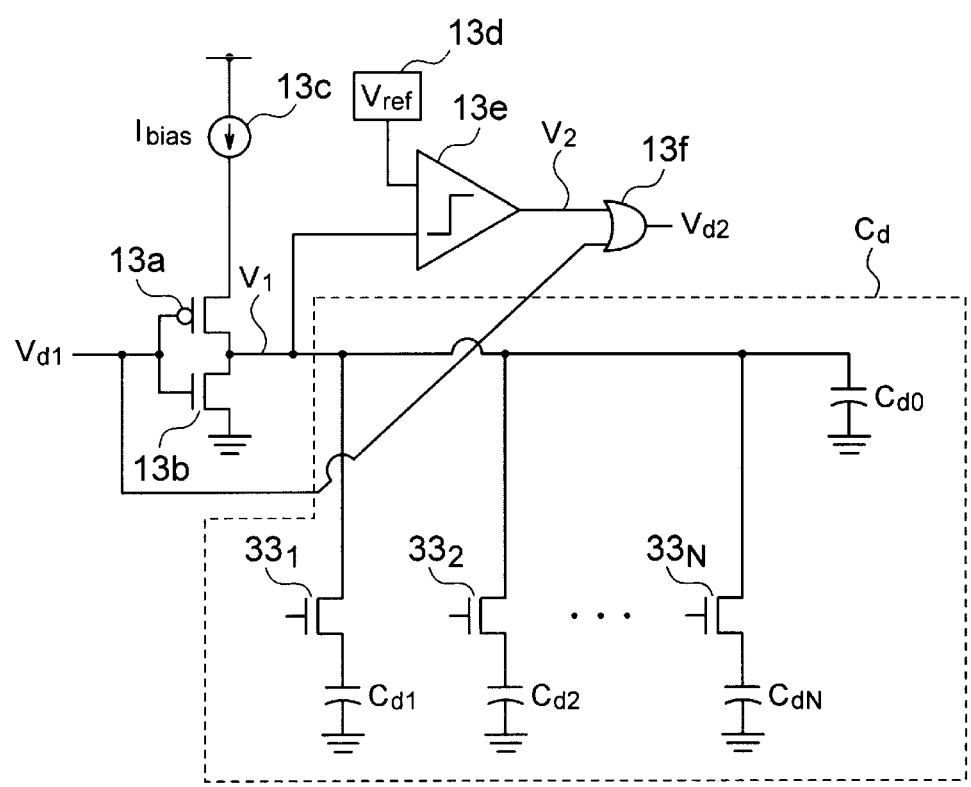
FIG. 15 is a circuit diagram illustrating a configuration of a delay circuit according to a fifth embodiment.

FIG. 15 is a circuit diagram illustrating a configuration of the delay circuit 13 according to a fifth embodiment.

The capacitor $C_d$ according to the fifth embodiment includes a capacitor $C_{d0}$ and capacitors $C_{d1}$ to $C_{dN}$, which are examples of first to $N^{th}$ capacitors, and transistors $33_1$ to $33_N$, which are examples of first to $N^{th}$ switches (where N is an integer equal to or greater than 2).

The capacitors $C_{d0}$ to $C_{dN}$ each have a constant capacitance, and are connected in parallel between the ground node and the node between the first and second transistors 13a and 13b. The transistors $33_1$ to $33_N$ are connected in series with the capacitors $C_{d1}$ to $C_{dN}$, respectively. Modulating signals $V_{mod}$ different from one another can be supplied to gates of the transistors $33_1$ to $33_N$, respectively.

The delay circuit 13 according to the fifth embodiment periodically changes the capacitance acting on the delay circuit 13 on the basis of these modulating signals $V_{mod}$. Specifically, the delay circuit 13 periodically changes the capacitance acting on the delay circuit 13 by switching on or off the transistors $33_1$ to $33_N$ connected to the capacitors $C_{d1}$ to $C_{dN}$. On the other hand, it is assumed here that the bias current $I_{bias}$ of the current source 13c and the voltage $V_{tune}$ of the voltage supply unit 13d are constant. As a result, the delay time $T_{on}$ of the delay signal $V_{d2}$ changes depending on a change in the capacitance acting on the delay circuit 13.

It is noted that FIG. 15 shows the reference voltage $V_{ref}$ as an example of the constant voltage $V_{tune}$. This reference voltage $V_{ref}$ may be either the same as the reference voltage $V_{ref}$ shown in FIG. 1 or different from the reference voltage $V_{ref}$ shown in FIG. 1.

FIGS. 16A to 16D are waveform charts for describing an operation of the delay circuit 13 according to the fifth embodiment.

Figure 16A:
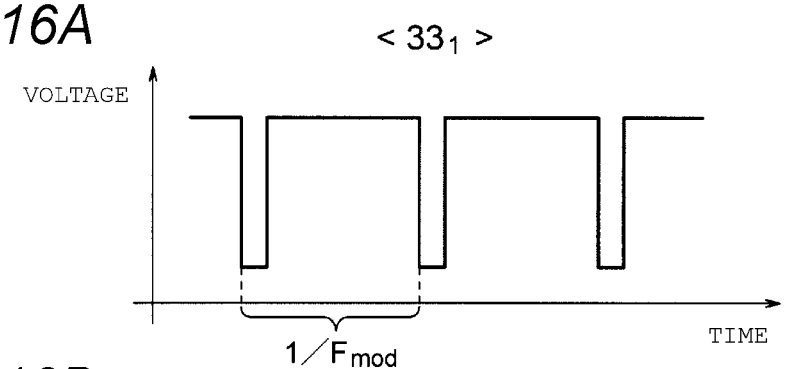
FIGS. 16A to 16D are waveform charts for describing an operation of the delay circuit according to the fifth embodiment.
Figure 16B:
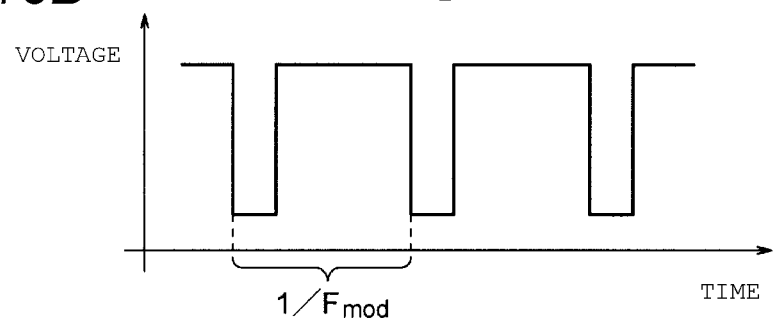
Figure 16C:
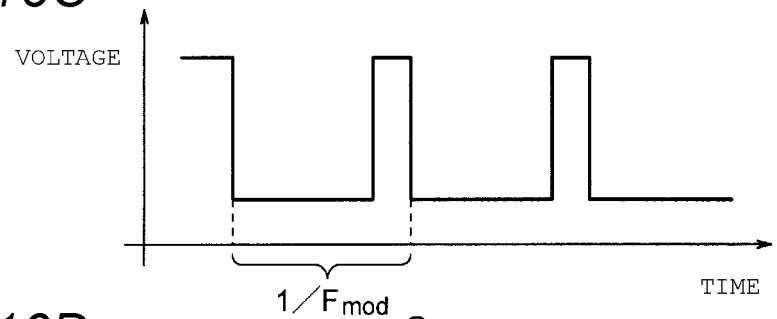
Figure 16D:
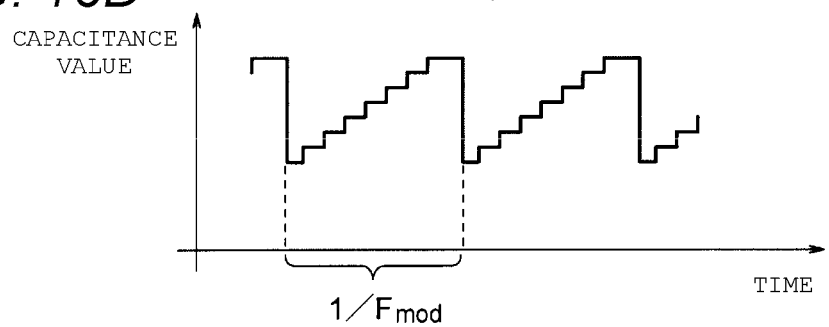

FIGS. 16A, 16B, and 16C show an example of the modulating signals $V_{mod}$ supplied to the transistors $33_1$, $33_2$, and $33_N$, respectively. FIG. 12D shows an example of a value of the capacitance acting on the delay circuit 13. The modulating signals $V_{mod}$ supplied to the transistors $33_1$ to $33_N$ are equally, periodically change at the frequency $F_{mod}$ but differ in pulse width (FIGS. 16A to 16C). As a result, the value of the capacitance acting on the delay circuit 13 periodically changes at the frequency $F_{mod}$ as shown in FIG. 16D.

As described so far, the delay circuit 13 according to the fifth embodiment periodically changes the delay time $T_{on}$ by periodically changing the capacitance acting on the delay circuit 13. It is thereby possible to tune the frequency F of the output signal $V_{out'}$ and the output signal $V_{out}$ to the frequency $F_{mod}$ of the modulating signals $V_{mod}$. According to the fifth embodiment, the delay circuit 13 is simpler than a PLL yet still enables the operating frequency of the voltage conversion apparatus 1 to be fixed.

Sixth Embodiment

Figure 17:
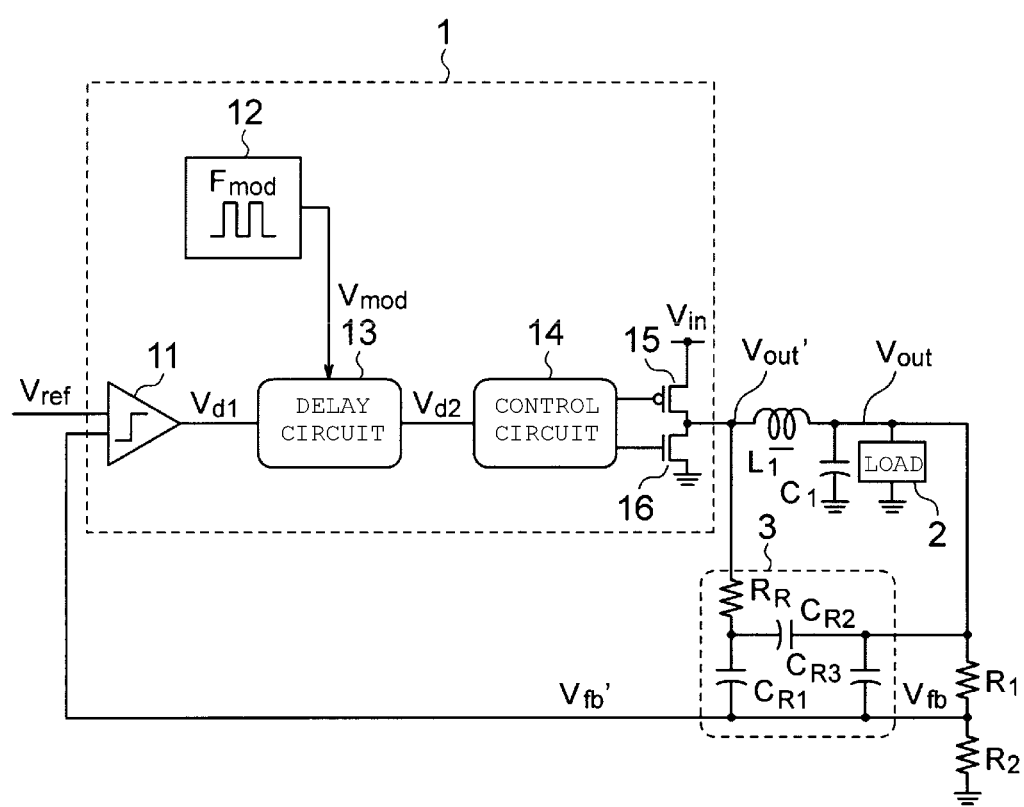
FIG. 17 is a circuit diagram illustrating a configuration of a voltage conversion apparatus according to a sixth embodiment.

FIG. 17 is a circuit diagram illustrating a configuration of the voltage conversion apparatus 1 according to a sixth embodiment.

FIG. 17 shows a DC-DC converter including a ripple injection filter 3, in addition to the constituent elements shown in FIG. 1. The ripple injection filter 3 is a circuit that injects a ripple into the feedback voltage $V_{fb}$ and that outputs a feedback voltage $V_{fb'}$, and the ripple injection filter 3 supplies the feedback voltage $V_{fb'}$ to the comparator 11.

The ripple injection filter 3 includes a resistor $R_R$ and capacitors $C_{R1}$, $C_{R2}$, and $C_{R3}$. The resistor $R_R$ and the capacitor $C_{R1}$ are connected in series between a first node, which is between the voltage conversion apparatus 1 and the inductor $L_1$, and a second node, which is between the node between the resistors $R_1$ and $R_2$ and the comparator 11. The capacitor $C_{R2}$ is disposed between a third node, which is between the resistor $R_R$ and the capacitor $C_{R1}$, and a fourth node, which is between the inductor $L_1$ and the resistor $R_1$. The capacitor $C_{R3}$ is disposed between a fifth node, which is between the node between the resistors $R_1$ and $R_2$ and the second node, and a sixth node, which is between the capacitor $C_{R2}$ and the fourth node.

The DC-DC converter according to the present embodiment can set a peak of the feedback voltage $V_{fb'}$ to be higher than a peak of the feedback voltage $V_{fb}$ by means of such a ripple injection filter 3. Thus, according to the sixth embodiment, it is possible to improve detection accuracy for a change in the feedback voltage $V_{fb'}$ in the voltage conversion apparatus 1.

It is noted that the ripple injection filter 3 according to the sixth embodiment is applicable to any of the first to fifth embodiments. That is, the sixth embodiment may be combined with any of the first to fifth embodiments.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voltage conversion apparatus, comprising:
    an output unit connected to an input voltage and configured to output an output voltage according to a control signal supplied to the output unit;
    a comparator configured to compare a reference voltage to a feedback voltage corresponding to the output voltage and output a comparison signal corresponding to the comparison;
    a delay circuit configured to output a delayed signal obtained by delaying either a rising timing or a falling timing of the comparison signal output from the comparator, the delay circuit varying a delay time of the delayed signal on basis of a modulating signal; and
    a control circuit configured to output the control signal to the output unit, the control signal being based on the delayed signal, the control circuit controlling the output unit such that a frequency of the output voltage is tuned to a predetermined value set according to the modulating signal, wherein
    the delay circuit comprises:
        a pair of output transistors connected in series, gates of the output transistors being commonly connected to the comparator and receiving the comparison signal;
        a constant current source connected to one end of the pair of output transistors, another end of the pair of output transistors being connected to a reference potential;
        a capacitor connected between the reference potential and an output node of the pair of output transistors;
        a second comparator having one input connected to the output node of the pair of transistors and the capacitor and a second input receiving a reference signal; and
        an OR logical unit receiving as inputs a second comparison signal from the second comparator and the comparison signal from the first comparator.

2. The voltage conversion apparatus according to claim 1, wherein the predetermined value is a frequency of the modulating signal.

3. The voltage conversion apparatus according to claim 1, wherein the delay circuit changes the delay time on the basis of the modulating signal.

4. The voltage conversion apparatus according to claim 1, wherein the delay circuit generates a modulation voltage that changes on the basis of the modulating signal, and changes the delay time on the basis of the modulation voltage.

5. The voltage conversion apparatus according to claim 1, wherein the delay circuit changes a capacitance acting on the delay circuit on the basis of the modulating signal, and changes the delay time on the basis of the capacitance.

6. The voltage conversion apparatus according to claim 1, further comprising:
    a flip-flop circuit receiving the comparison signal at a reset terminal and the delayed signal at a set terminal, a Q terminal of the flip-flop circuit being connected to a switch.

7. The voltage conversion apparatus according to claim 1, wherein the pair of output transistors comprises a p-channel transistor and an n-channel transistor and the output node is between the p-channel transistor and the n-channel transistor.

8. The voltage conversion apparatus according to claim 1, further comprising:
    a ripple rejection filter connected to an output node of the output unit.

* * * * *